United States Patent [19]

Gerry

[11] 4,292,569
[45] Sep. 29, 1981

[54] HIGH ENERGY MODULATION IGNITION SYSTEM

[76] Inventor: Martin E. Gerry, 13452 Winthrope St., Santa Ana, Calif. 92705

[21] Appl. No.: 46,569

[22] Filed: Jun. 7, 1979

Related U.S. Application Data

[63] Continuation-in-part of Ser. No. 923,828, Jul. 12, 1978, Pat. No. 4,216,412.

[51] Int. Cl.$^3$ .................... H05B 37/02; H05B 39/04; H05B 41/36
[52] U.S. Cl. ............................. 315/209 R; 315/172; 315/176; 315/209 T; 123/620; 123/622; 123/653
[58] Field of Search ............ 315/209 T, 209 CD, 176, 315/209 R, 174, 172; 123/148 E, 620, 622, 653

[56] References Cited

U.S. PATENT DOCUMENTS

| | | | |
|---|---|---|---|
| 3,906,919 | 9/1975 | Asik et al. | 315/209 CD |
| 3,972,315 | 8/1976 | Munden et al. | 315/209 CD |
| 4,033,316 | 7/1977 | Birchenough | 315/176 |

Primary Examiner—Saxfield Chatmon, Jr.

[57] ABSTRACT

An ignition system uses a transformer with a primary winding and a secondary winding wherein the secondary winding is intermittently coupled to at least one igniter load. An electronic switch is connected to the primary winding. Such electronic switch has an input circuit and an output circuit for enabling electrical energy to be stored in the primary winding. The electronic switch may have an additional switching stage feeding its input circuit for establishing the charging period of the primary winding consistent with the logic of a conventional ignition system. A timer is electrically coupled to the additional switching stage for intermittently activating such electronic switch. An alternating current modulator is connected to the primary winding so as to provide a modulating signal during the discharge period of the system thereby modulating the discharge current of the primary winding. Protective devices may be connected between the input and output circuits of the electronic switch so as to protect such switch against high transient surges. A capacitor may be connected to the secondary winding of the ignition transformer.

16 Claims, 12 Drawing Figures

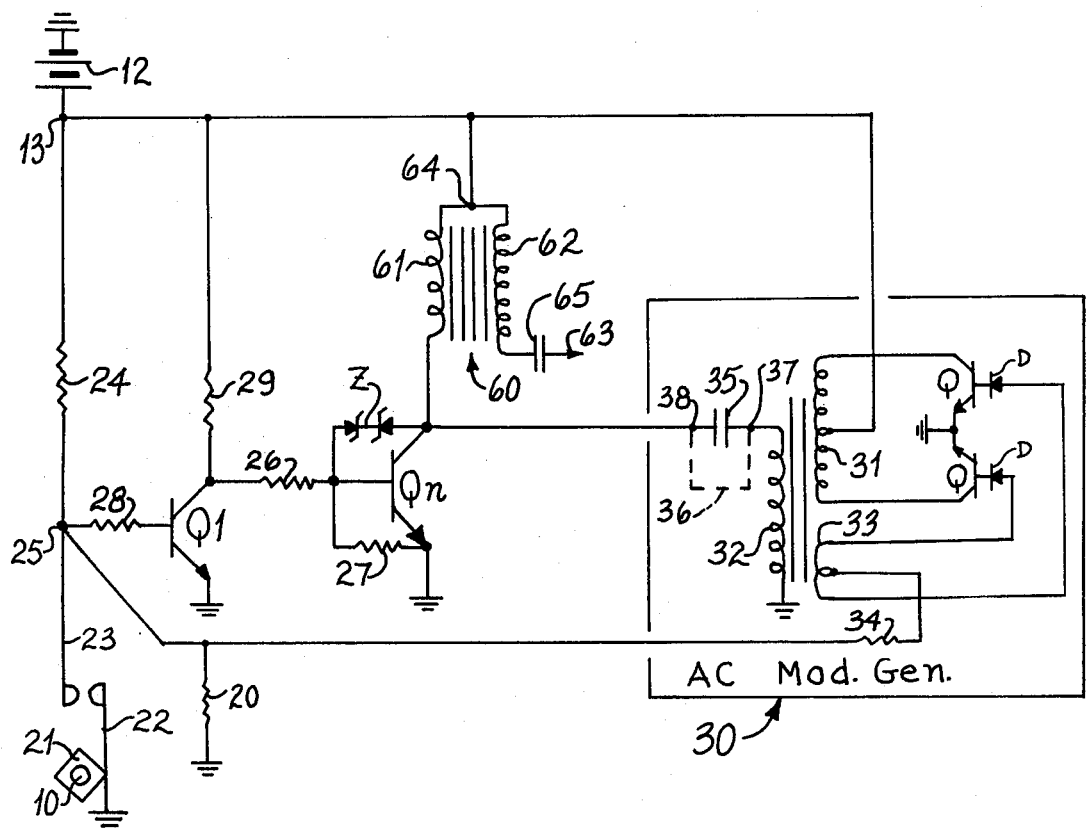
FIG. 1
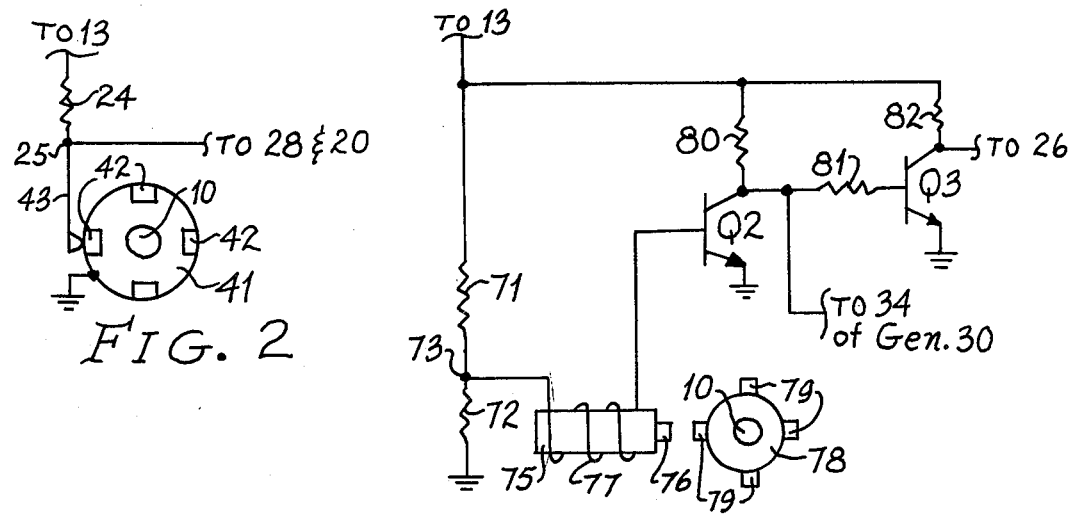
FIG. 2
FIG. 3

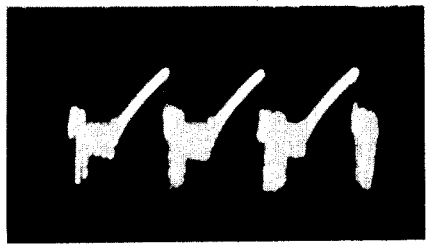
FIG. 8 — Winding 61 Current With Modulation
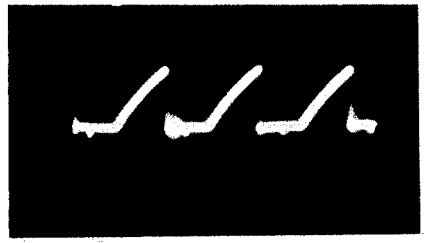
FIG. 9 — Winding 61 Current Without Modulation
FIG. 10 — Winding 61 Voltage With Modulation
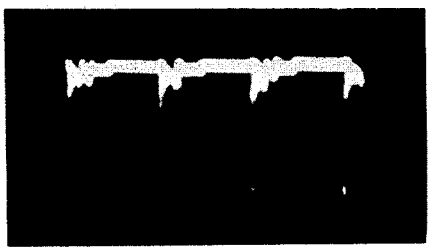
FIG. 11 — Winding 61 Voltage Without Modulation
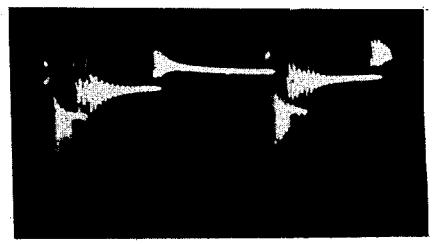
FIG. 12 — Winding 61 Voltage Perturbation Detail Without Modulation

HIGH ENERGY MODULATION IGNITION SYSTEM

CROSS REFERENCE TO RELATED APPLICATION

This application is a continuation-in-part of copending application Ser. No. 923,828 filed July 12, 1978, now U.S. Pat. No.4,216,412.

BACKGROUND OF THE INVENTION

This invention is in the field of ignition systems for fuel burning engines and in particular in such ignition systems which have only discrete inductors in their primary firing circuits, which primary firing circuit is devoid of capacitors, and wherein such systems produce high velocity igniter arcs.

The principal prior art ignition systems may be categorized into three groups. The first category of such prior art systems, referred to as the Kettering system, uses a capacitor in series with a primary winding of an ignition transformer wherein the capacitor is short-circuited by a timer so as to permit the primary winding to be charged by a DC source. The timer then removes the short circuit from the capacitor to permit the charged winding to discharge into the capacitor so as to create a single ringing current component, used to fire an igniter.

The second category of such prior art systems, referred to as a capacitive discharge system, also has a capacitor in series with an ignition transformer winding. Controlled by an appropriate timer, the capacitor is charged, generally by a higher DC voltage than in the Kettering system, such higher DC voltage being generated in the system. The timer then enables the charged capacitor to discharge into the transformer winding also creating a single ringing current component of somewhat higher voltage peak than the Kettering system to fire an igniter.

The third category of such prior art systems involves the use of a generated AC wave by such prior art system and attempts to apply such generated wave either to an ignition transformer or directly to a distributor in order to fire an igniter.

With respect to the first category, or Kettering prior art system, the main problem lies in the fact that the system attempts to precharge an inductor by connecting a DC source directly thereto and without intermediate current amplification means to precharge such inductor, in anticipation of an igniter firing cycle. It is well-known that an inductor energized directly by DC power cannot charge to its full current level in a short period of time, and therefore, cannto rapidly produce an induced voltage therein. Hence, only a portion of the maximum current quantity can be made to flow through the primary winding during the charging mode, with consequent nonuse of the full energy storage capability of such primary winding, and therefore, loss of electrical power delivery capability to fire the igniter, is experienced.

With respect to the second category of capacitive discharge system, a like result, with very little improvement over the Kettering system, is realized.

In such second category system, the higher DC voltage to precharge the capacitor is obtained by using an electronic oscillator to generate a higher AC voltage which is then converted to DC by rectification and filtering. The higher DC voltage is controlled by a timer to precharge the capacitor and then discharge the capacitor into the ignition transformer winding to fire an igniter. If one keeps in mind that a charged capacitor is just like a DC source, then one can apply the foregoing in an analogy to the Kettering system. Although the voltage across the capacitor will be higher than in the case of the battery voltage of the Kettering system, one must not lose sight of the fact that the energy content of a charged capacitor is limited by the capacitance and hence its ability to deliver current for an extended time period is limited. Hence, although a higher peak single ringing cycle will result due to the charge from the capacitor being dumped into the transformer winding, the single ringing period will be substantially shortened compared with the single ringing period of the Kettering system.

Since energy is a function of the product of power and time, the advantage of the capacitive discharge system over the Kettering system is minimized due to the lesser amount of time during which energy is present to fire the igniter.

With respect to the third category of prior art ignition systems or the AC systems, the major problem resides in the inability of the prior art to recognize how to transfer the power from the AC generator to the load, the load generally being a transformer. Consequently, although such system might basically be able to provide AC power over longer periods of time, these systems suffer from the lack of technique in effectively transferring such power and particularly providing higher current levels to the load.

The need for such higher current levels has been repeatedly stated in periodicals and patents written by those in the automotive manufacturing industry and in the automotive fuel-producing industry. Such periodicals or patents generally show a high power AC rectangular wave generator employing a transformer wherein one of the windings thereof is used to saturate the transformer core by employing a DC source connected to that winding, so as to prevent the generator from producing power. A timer, coupled to such winding, enables the core to go out of saturation, and ostensibly enables the generator to provide AC power by magnetic induction through a high voltage winding of the transformer to an igniter load.

The basic problem with such generator resides in the high impedance experienced in the electronic circuit of the generator where the transistors are located, when under actual load conditions such as when the igniter is attempting to arc. Reflected impedance of the high voltage winding into the lower voltage winding to which the transistors are connected, plus the self-impedance of such lower voltage winding would severely limit the current circulating in the collector-emitter circuits, and consequently would result in a lowered voltage and severely reduced current levels deliverable to the actual igniter. Thus, not only is the voltage across the so-called high voltage winding of such prior art AC system lower than expected, but the required higher current level for feeding the igniter in order to overcome high pressure fuel-flow across the igniter base, and in particular where the air-to-fuel ratio is in the order of 15 to 1 or greater (lean-burn engines), is not available.

Additionally, such prior art AC systems are inhibited from rapid duty cycling of their AC generator principally by magnetically saturating the generator's transformer core to inhibit oscillations. Sight is lost of the fact that the DC current used to saturate such core results in a comparatively long time for the core to reach saturation and hence slows up the cycling of the generator between its operative and quiescent mode. As a result, the prior art AC systems provide triangular-shaped current waveforms which inherently have slow rates of change in their waveforms as a function of time and therefore result in a reduced induced voltage in the high voltage winding, inasmuch as by Faraday's law of induction, such reduced voltage is a function of the rate of change of current. It can be appreciated that if, for example, the prior art could have overcome the above problems residual in their AC source and could provide a current waveform output with a fast rate of change, such as one approaching a rectangular waveshape, at least the output voltage of such generator would be increased. However, the problem of being able to deliver higher currents to the load would still remain unsolved.

Accordingly, neither the Kettering, capacitive discharge, nor AC system has the capability of delivering sufficient quantities of energy to fire an igniter, in order to enable the igniter to cause all fuel in an engine cylinder to be consumed and not wasted by failure of the ignition arc to burn same.

Another disadvantage of the prior art systems is their dependence upon a capacitor in series with the ignition transformer's primary winding to create an oscillatory or ringing mode.

Yet another important disadvantage of any prior art system is the inability of the system of accelerate the arc's luminous particles to such high velocity so that such arc can adequately overcome internal engine and fuel-flow pressures. Such prior art systems are therefore unable to use an igniter that develops long arc lengths between its electrodes. Such deficiency results in initiation of a small fuel ignited nodule during the initial ignition period which is insufficient in mass and area to cause all fuel in a cylinder to be consumed and not wasted.

Other disadvantages with such prior art systems reside in their complexity due to the need of a large quantity of electronic components which also give rise to unreliability as well as high cost of production.

SUMMARY OF THE INVENTION

Accordingly, one objective of this invention is to provide an ignition system which would deliver a high energy quantity during each igniter firing period so that all fuel in the engine cylinder would be ignited and converted to useful power without passing any unignited fuel into the engine's exhaust system.

Another objective of this invention is to provide an ignition system which is independent of any discrete capacitor to provide an igniter firing current.

Yet another objective of this invention is to modulate the discharge current from the primary winding with alternating current so as to provide a series of pulses during an igniter firing period.

Still another objective of this invention is to provide an ignition system which will develop long arcs across the bases of igniters used therein and wherein such long arcs, composed of luminous particles, shall have velocities substantially higher than velocities of arcs developed either by a Kettering, capacitive discharge or prior art AC systems, in order to overcome high internal engine pressures and high pressure fuel-flow past the electrodes of the igniters.

Yet a further object of this invention is to provide highly reliable electronic circuitry using a minimum number of parts and simple in structure.

Hence, a system is provided which utilizes an electronic switch connected to the primary winding of the ignition transformer. Such switch is electrically coupled to a timer which enables the switch to be turned on and off, in alternation, so as to intermittently provide energy to at least one igniter of the system. This system is independent of any discrete capacitor for establishing igniter firing current. Such electronic switch amplifies the current flowing in the primary winding during the primary winding charge mode and thereby charges the primary winding rapidly and more completely.

The discharge current from the primary winding is then modulated by an alternating current source during the discharge mode of the system which modulation increases the number of pulses available during any one ignition cycle, thereby also increasing the energy fed to any of the igniters.

The secondary winding of the ignition transformer may optionally be connected to a capacitor of suitable high voltage rating. Such capacitor raises the secondary current and current in the igniter load very substantially as well as raising the secondary winding induced voltage due to the higher current level.

By connecting a zener diode or other similar protective device across the terminals of the electronic switch, such electronic switch is protected against high surges or transients developed in the primary winding of the ignition transformer.

The velocity of an arc, created at the base of the igniter, is substantially increased as compared with the arc velocity where an igniter is powered by either a Kettering, capacitive discharge or prior art AC system.

Additionally, the inventive system enables the use of an igniter which has about 250 thousandths of an inch in dimension between its arcing electrodes, to create an arc which may be as long as 350 thousandths of an inch. Such dimension between electrodes is established by removing the gap-adjusting member from a conventional igniter so that arcs can travel between the axial electrode and the inner base periphery. Such long arc would be extinguished in prior art ignition systems, even if such systems were capable of producing such arcs, due to the high internal engine pressure. However, the increased arc velocity of the inventive system, easily overcomes such engine pressure and inhibits extinguishment of these long arcs, which arcs provide better fuel combustion.

The arc phenomena per se is a matter of additional importance. Such arc is comprised of an elongated filament of highly concentrated luminous particles, which filament extends between the axial electrode and base. The filament is increased in thickness at its ends. Surrounding such filament is an envelope of luminous particles of lesser density than the filament, such envelope having approximately spherically-shaped terminations which will often glow like a light bulb.

BRIEF DESCRIPTION OF THE DRAWINGS

FIG. 1 is an electrical schematic of the ignition system in accordance with the invention.

FIG. 2 is a schematic drawing of a timer which may be substituted for the timer used in FIG. 1.

FIG. 3 is a schematic drawing of a magnetically generating pulse timer which may be substituted for the timer used in FIG. 1.

FIG. 8 is an oscilloscopic photograph of the current through the ignition transformer primary winding wherein the primary winding discharge current is AC modulated.

FIG. 9 is an oscilloscopic photograph of the current through the ignition transformer primary winding wherein the primary winding discharge current is not modulated.

FIG. 10 is an oscilloscopic photograph of the voltage induced in the ignition transformer primary winding under conditions when the primary winding discharge current is AC modulated.

FIG. 11 is an oscilloscopic photograph of the voltage induced in the ignition transformer primary winding under conditions when the primary winding discharge current is not modulated.

FIG. 12 is an oscilloscopic photograph of the voltage shown in FIG. 11 depicting a plurality or ringing waveforms existing in the voltage pattern of FIG. 11. The ringing waveform detail was obtained by expanding the sweep rate of the oscilloscope time base and by increasing the oscilloscope's amplitude sensitivity.

DETAILED DESCRIPTION

Figure 4:
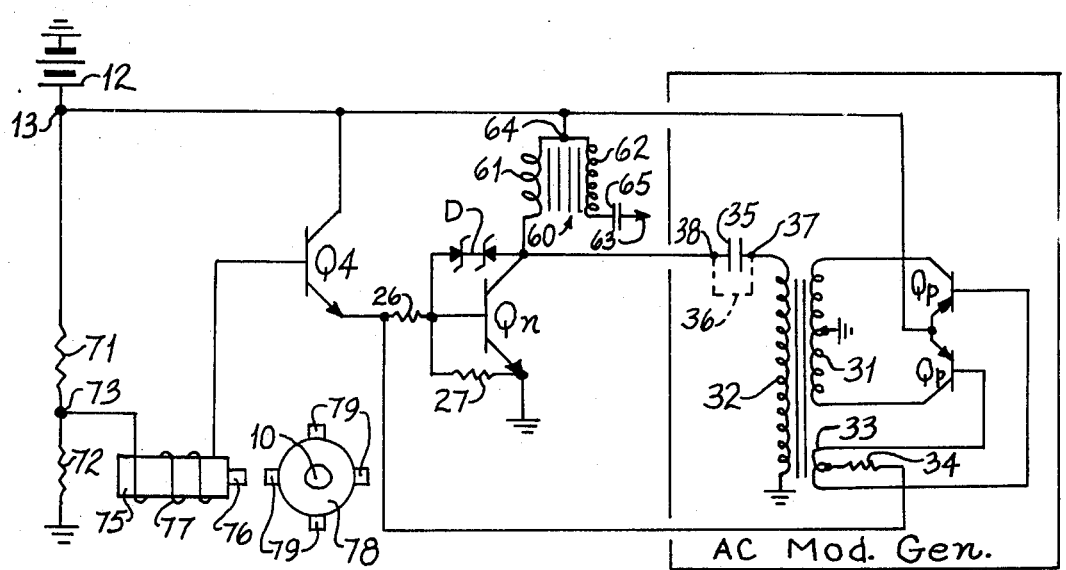
FIG. 4 is an electrical schematic of the ignition system utilizing a magnetically generating pulse timer in accordance with the invention.

Referring to FIG. 1, an ignition system delivering large quantities of electrical energy to an igniter or igniters in a fuel combustion engine, employs technical principles which avoid the dependency upon a capacitor to establish ignition current. Such system is basically simple in its configuration, utilizing a minimum number of electronic components and is highly effective as well as reliable in its operation.

In this system, the conventional ground symbol in the drawings refers throughout this specification to negative battery potential which is the zero reference level for DC or AC voltages or currents, and is also the signal return path for all electrical signals.

Battery 12 provides DC power from its positive terminal 13 to a timer, a primary winding 61 of ignition transformer 60, to alternating current modulation source 30 and to the electronic switch Qn.

The time is actuated by means of cam 21 driven by a conventional distributor shaft 10 so that contactors 22 and 23 are closed and opened in alternation.

When none of the high portions of cam 21 cooperates with contactor 22, contactors 22 and 23 are closed, and when one of the high portions of cam 21 cooperates with contactor 22, contactors 22 and 23 are open. Contactor 23 is connected at junction 25 to resistor 24, and resistor 24 is connected to junction 13 to obtain positive battery voltage thereat. Junction 25 is the control point in this system and timer and is used to connect to the biasing circuit of electronic switch Qn. Switch Qn is a high voltage, high current semiconductor device with a high DC forward current amplification characteristics, such as a Darlington transistor.

The purpose of resistor 24 is to provide a positive DC potential to the bias circuits of switch Q1 and switch Qn and also transistors Q when contactors 22 and 23 are open, and also to place control point 25 at ground or zero potential when contactors 22 and 23 are closed, without placing a short-circuit across battery 12. Resistor 20, connected between junction 25 and ground, enables the bias voltage to be reduced from the battery voltage so that the base to emitter voltages, due to biasing of the transistors, do not exceed the specifications therefor.

Junction 25 has resistor 28 connected to the base of transistor Q1. The purpose of resistor 28 is to protect the base-to-emitter junction of Q1, and can be used to limit the base current of Q1 to a desired level. Resistor 29 is connected between the collector of Q1 and junction 13, and the collector of Q1 is connected to base current limiting resistor 26 which is in turn connected to the base of Qn. A high voltage surge protector network consists of bipolar zener diode assembly Z connected between the collector of Qn and its base together with a low ohmic valued resistor 27 connected between the base of Qn and its emitter, which emitter is at ground potential. Such protector network limits the voltages between both the collector and base and the collector and emitter of Qn to the zener knee voltage rating of Z, and may be selected to regulate the voltage between the collector and emitter of Qn in the range of 400 to 500 volts, depending on the particular type of Qn selected, since such switch is rated not to exceed the 550 or 600 volt limit.

Surge protector Z may also consist of a suitable voltage rated unipolar zener diode assembly where the cathode of the assembly is connected to the collector of Qn and the anode is connected to the base of Qn.

The collector of Qn is connected to primary winding 61 of transformer 60 and the other side of winding 61 forms a common junction 64 with secondary winding 62 of transformer 60. Junction 64 is connected to junction 13 to enable DC current to flow through winding 61 during the charge mode of the system, during which period Qn is turned on and generator 30 is turned off. High voltage lead or cable at 63 is normally connected to a high voltage distributor when more than one igniter is used in the system, or is connected directly to the igniter when the ignition system comprises only one igniter.

Capacitor 65 is shown connected to winding 62, which would interpose such capacitor between such winding and the igniter load connected by means of cable 63. Such capacitor compensates for current lag in secondary winding 62, due to the high inductance of such winding, with respect to the voltage induced in winding 62. Winding 62 being part of the igniter load circuit, such current lag would normally serve to delay creation of the ignition arc across the igniter base beyond desirable time limits. The capacitive reactance of capacitor 65 compensates at least in part for the high inductive reactance of winding 62 to reduce the secondary circuit impedance to current flowing in winding 62 during arcing period of the igniter, thereby also raising the secondary or igniter circuit current level. Since the rate of change of secondary current will cause an induced secondary voltage proportional to the rate of change of its current, a higher current level will create a higher secondary voltage. Such increased secondary voltage will be reflected as an increased voltage measured across primary winding 61 of transformer 60.

It should be noted, that any series circuit may have its parallel electrical equivalent, and consequently, winding 62 and capacitor 65 in series therewith may be converted to a parallel circuit wherein capacitor 65 is connected across the terminals of winding 62, though in such case, the value of the capacitor will be different than when in series with winding 62.

In illustrating the principles of the invention, the cam-actuating contactor timer was chosen for its simplicity so as to more easily illustrate and explain the switching function of the system. But it should be noted that any timer circuit such as shown in FIGS. 2, 3 and 4 may be used as direct substitutes for the cam-actuating contactor timer.

It should also be noted that although a capacitor normally used in connection with cam actuated contactors is not needed herein, but if desired may remain connected to the contactors of the timer without interfering with the principles of the inventive system.

It should also be noted that switch Q1 is not absolutely needed in the circuit of FIG. 1 inasmuch as control point 25 may be directly connected to resistor 26. However, in such connection, winding 61 will be charged when the contactors are open and discharged when they are closed, which logic is opposite from a conventional Kettering ignition system, and in a testing program comparing the Kettering system with the instant system, readjustment of the dwell period of the contactors would be required when switching from the inventive system to the Kettering system, or vice-versa. Such readjustment of dwell angle is avoided by utilizing the additional stage Q1. Such switch Q1 changes the timing and dwell logic compatible to a Kettering system to enable convenient switching therebetween.

A unipolar alternating current rectangular wave generator 30 is duty cycled by the timer so that such generator is quiescent during the period when primary winding 61 is being charged and is conductive during discharge periods of winding 61. Unipolarity of the AC output wave is obtained by virtue of one one end of winding 32 being at ground or reference potential. Such generator is connected to the collector of Qn and modulates the discharge current from winding 61 during the discharge mode of the system, providing a plural number of pulses in the resultant modulation envelope which effectively increases the energy level fed to any igniter. It should be emphasized that although a rectangular wave generator was used in view of its convenience in construction and simplicity of configuration, that any AC generator providing any waveform or even random waves may be used as a modulation source.

This system does not depend upon a capacitor to create an ignition oscillation inasmuch as this system will function as shown without generator 30 being connected thereto providing ignition power, as is evident from the oscilloscopic photographs, FIGS. 9, 11 and 12 and discussion apertaining thereto.

Generator 30 shows capacitor 35 connected to winding 32, such capacitor being bridged by jumper wire 36 at points 37 and 38. Such capacitor is optional and helps transfer the substantially large currents circulating in winding 31 to winding 32. When a proper impedance adjustment between ignition transformer 60 and the transformer of generator 30 is obtained, such capacitor 35 would not be needed in the circuit. However, transformers such as required in generator 30 are difficult to design due to many non-linear variables involved, and it is simpler and more expedient to adjust the impedance utilizing such capacitor 35.

The basic operation of generator 30 simply is to create oscillation by using winding 33 to feed back a signal from output winding 32 into winding 31. This generator is duty cycled on and off by providing a bias voltage intermittently from control point 25 to create a DC bias current in resistor 34, which bias current starts one of stages Q to oscillate first due to minute dissimilarities in these transistors. A diode D may be connected in series with each base of transistors Q in a forward base current direction in order to prevent current from flowing in a direction from the collector to the base of either of transistors Q and thereby damaging the transistor. When used with the PNP type transistors of oscillator 30a in FIG. 4, diodes D are connected in series with each base, with the anode thereof connected to the base.

Except for a different load at the output winding and the elimination of a capacitor across the battery powering the generator, generator 30 is the same as schematically shown in U.S. Pat. No. 3,841,287 (Fig. 4). Generator 30 is referred to in the art as a Royer oscillator, and a better description of such oscillator operation may be found in technical bulletin TC-101B entitled Tape Wound Cores, published by Arnold Engineering Company of Marengo, Illinois at pages 45 and 46, copyright 1972.

Generator 30 was designed using a tape wound torroidal core having a square loop hysterysis characteristic, wherein primary 31 used 12 turns center tapped of number 16 gage wire, winding 32 used 104 turns of number 22 gage wire and winding 33 used 2 turns center tapped of number 22 gage wire.

Capacitor 35 was chosen at 0.5 microfarads of paper dielectric material at a 600 volt rating, though such capacitance was not critical. Virtually any oscillation frequency of generator 30 is adequate, but the higher the frequency the more modulation pulses will be present in the modulation envelope. A convenient frequency of oscillation for this purpose would be in the order of 5 kilohertz.

It should be noted, that although current limiting bias resistor 34 is shown connected between control point 25 and the center tap of winding 33, that in actuality such resistor 34 may be eliminated and the center tap of winding 33 connected directly to control point 25 inasmuch as resistor 24, which provides the bias current for the transistors herein, can be selected of a proper value so as to enable elimination of resistor 34. The same is true in connection with the configuration of FIG. 4.

The configuration of FIG. 1 utilizing the cam-actuating contactor timer, may be briefly summarized by the following logic table:

| Contactors 22 and 23 | Potential at Junction 25 | State of Qs | State of Q1 | State of Qn | Condition of Winding 61 |
|---|---|---|---|---|---|
| closed | 0 | OFF | OFF | N | charges |
| open | + | ON | ON | OFF | discharges and modulated by generator 30 |

FIG. 2 illustrates a disk-contactor timer, wherein disk 41 is of electrically conductive material and at ground

| Protrusion 79 | Potential at Q4 Base | State of Q4 | Potential at Q4 Emitter | State of Transistors Qp | State of Qn | Condition of Winding 61 |
|---|---|---|---|---|---|---|
| not driven past pole piece 76 | + | ON | + | OFF | ON | charges |
| driven past pole piece 76 | − | OFF | 0 | ON | OFF | discharges and modulated by generator 30a |

Figure 5:
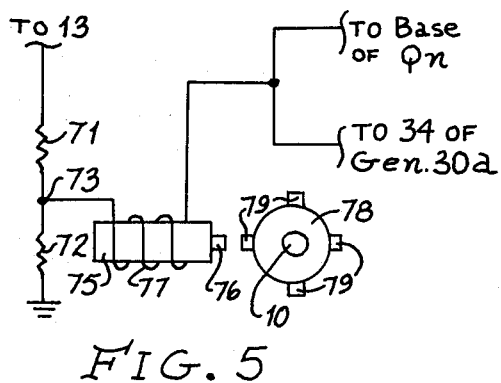
FIG. 5 is a schematic drawing of a magnetically generating pulse timer which may be substituted in the system shown in FIG. 4.

FIG. 5 shows even a more simplified version of the system using magnetically generating pulse timing. In this configuration generator 30a provides the unipolar alternating current.

The magnetic type timer of this configuration utilizes the same timer components as in the FIG. 3 configuration, but winding 77 is now connected directly to the base of Qn, instead of to the base of Q2 as in FIG. 3. The end of such winding 77 is also connected to resistor 34 of generator 30a. The resistance of winding 77 is more than adequate to limit the base current of Qn to safe levels.

The logic of the system utilizing the magnetically generating pulse timer as in FIG. 5, may be summarized by the following table:

| Protrusion 79 | Potential at Base of Qn | State of Qp Transistors | State of Qn | Condition of Winding 61 |
|---|---|---|---|---|
| not driven past pole piece 76 | + | OFF | ON | charges |
| driven past pole piece 76 | − | ON | OFF | discharges and modulated by generator 30a |

Figure 6:
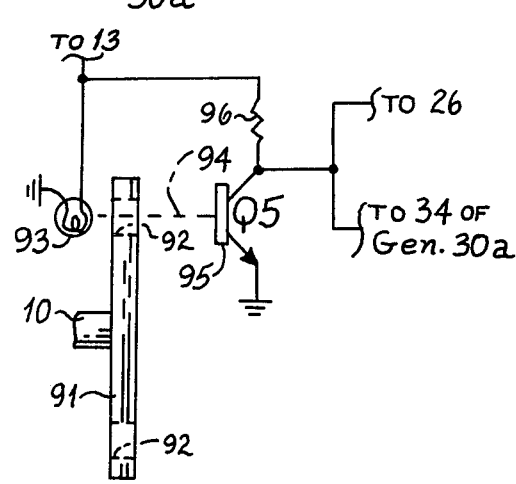
FIG. 6 is a schematic drawing of an optically generating pulse timer which may be substituted for the timer illustrated in FIG. 4.

FIG. 6 illustrates the basic system utilizing an optically generating pulse timer, which substitutes for the timer used in FIG. 1 configuration. Such timer comprises an optically opaque disk 91 driven by distributor shaft 10. Disk 91 has a number of apertures 92 regularly spaced from each other at the disk periphery. A lamp or light-emitting diode 93 is connected to a +DC potential point at 13, and light-activated transistor switch Q5 has its emitter at ground potential and its collector connected to +DC junction 13 through resistor 96. The collector of Q5 is also connected to bias resistor 26 of Qn and to bias resistor 34 of generator 30a. Generator 30a is connected to the collector of Qn and all other connections involving Qn and generator 30a are the same as in the FIG. 4 configuration.

When disk 91 is driven so that its opaque portion blocks light beam 94 emanating from lamp 93, base 95 of Q5 is effectively at zero potential and Q5 does not conduct, thereby causing its collector to remain at +DC potential and inhibiting conduction of the Qp transistors in generator 30a. The collector potential of Q5 provides the proper biasing potential to resistor 26 and hence to the base of Qn causing Qn to conduct and thereby charging primary winding 61 with DC current. When disk 91 is driven into position to permit light beam 94 to pass through one of apertures 92 and impinge on light-sensitive base 95 of Q5, Q5 will conduct driving its collector down to zero potential, thereby turning off Qn and turning on the Qp transistors in generator 30a to start generator 30a oscillating. Since generator 30a is connected to the collector of Qn, the output of generator 30a will modulate the discharge current from winding 61.

The logic provided by the system utilizing the optically generating pulse timer as in FIG. 6, may be summarized as follows:

| Disk 91 Driven So That Light Beam 94 | Potential at Base of Q5 | State of Q5 | Potential of Q5 Collector | State of Qp Transistors | State of Qn | Condition of Winding 61 |
|---|---|---|---|---|---|---|
| cannot pass through aperture 92 | 0 | OFF | + | OFF | ON | charges |
| passes through aperture 92 | + | ON | 0 | ON | OFF | discharges and modulated by generator 30a |

Figure 7:
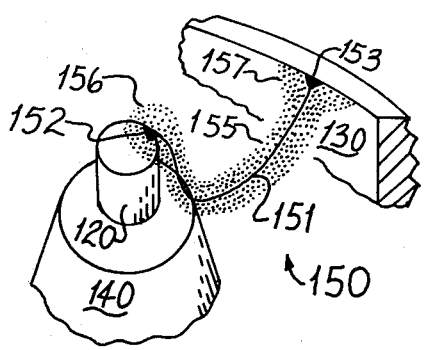
FIG. 7 is a perspective drawing of a portion of the base of an igniter as modified by the invention and showing the arc phenomena across the base of such igniter provided by this invention.

FIG. 7 is representative of the arc phenomena experienced, which arc can be obtained using any of the configurations of the ignition system discussed herein.

A portion of an igniter base is illustrated showing a part of the threaded base and particularly the electrically conductive inner periphery 130 of the base. Axial electrode 120, which is common to igniters, is embedded in ceramic insulator 140, the firing end of electrode 120 protruding from insulator 140.

The high velocity arc that is created is shown generally at 150. Such arc appears to comprise and elongated core or filament of concentrated luminous particles 151 having spread-out terminations 152 and 153 at both the axial electrode and inner base periphery respectively. An aura of lesser concentration of luminous particles 155 surrounds core or filament 151, the ends 152 and potential by virtue of being affixed to engine distributor shaft 10 which is at ground potential. Disk 41 has electrically insulative members 42 regularly spaced at its periphery within the disk confines. The periphery of the disk is in cooperation with contactor 43 which has a resistor 24 in series therewith, the resistor being connected to a positive DC terminal at 13 of FIG. 1. This timer is in lieu of the cam-actuated contactor timer. Junction point 25 is connected to bias resistor 28 so that this timer can perform the same function as the cam-actuated contactor timer.

Using FIG. 2 timer in the circuit of FIG. 1, the logic of the system may be summarized as follows:

| Contactor 43 Cooperating With | Potential at Junction 25 | State of Qs | State of Q1 | State of Qn | Condition of Winding 61 |
|---|---|---|---|---|---|
| conductive portion of disk 41 | 0 | OFF | OFF | ON | charges |
| member 42 | + | ON | ON | OFF | discharges and modulated by generator 30 |

FIG. 3 illustrates a magnetically generated pulse timing configuration preceding transistor stage Qn, wherein magnetic reluctor wheel 78 is driven by engine distributor shaft 10. A positive DC potential is provided by junction 13 so that the magnetic pulse timer is powered by DC source 12. A voltage divider resistive network 71 and 72 provides approximately +1.2 volts at 73 to coil 77 wound on permanent magnet core 75, by virtue of one end of resistor 71 being connected to junction 13. Core 75 has a magnetic pole piece 76 for enabling magnetic flux to be induced in coil 77 by virtue of magnetic protrusions 79, integral with reluctor wheel 78, being driven past pole piece 76 due to shaft 10 being driven by the engine. The other end of coil 77 is connected to the base of transistor Q2. Transistor Q2 has its collector connected to +DC power at junction 13 through resistor 80. The collector of Q2 is also connected to bias resistor 34 of generator 30 for turning said generator on at the appropriate time to modulate discharge current from winding 61. The collector of Q2 is also connected to base current limiting resistor 81 connected to the base of Q3. The collector of Q3 is also connected to +DC through resistor 82 which is tied to junction 13. Such collector of Q3 is also connected through base current limiting resistor 26 to the base of Qn. The emitters of Q2 and Q3 are at ground or zero potential. The remaining portions of the system are identical to the description given in connection with FIG. 1.

Consequently, when reluctor wheel 78 is at standstill, the base of Q2 is at positive DC potential and Q2 conducts establishing the collector of Q2 at zero potential and inhibiting conduction of Q3 as well as inhibiting oscillation of generator 30. Under such conditions the collector of Q3 is at positive potential permitting base current to flow in Qn and causing Qn to conduct to charge primary winding 61 with DC current. During the charging period of winding 61, the Qs of generator 30 are non-conducting. When resluctor wheel 78 is being driven so that protrusion 79 passes pole piece 76, a negative-going pulse, greater in magnitude than the positive potential provided by network 71-72 to the base of Q2, is generated by this timer and induced in winding 77. Such negative pulse overcomes the positive potential at the base of Q2 driving the base of Q2 negative and causing Q2 to stop conducting. At this point in the event sequence, the base of Q3 is at positive potential and conducts and bias resistor 34 of generator 30 is at positive potential to start generator oscillating. Since Q3 conducts, its collector is driven to zero potential causing Qn to stop conducting and beginning the discharge mode of the charged winding 61. Since generator 30 is connected to the collector of Qn and such generator is oscillating, the oscillations will modulate the discharge current as above described.

The logic of the system utilizing the magnetically generating pulse timer as in FIG. 3, may be summarized by the following table:

| Protrusion 79 | Potential at Base of Q2 | State of Q2 | State of Qs | State of Q3 | State of Qn | Condition of Winding 61 |
|---|---|---|---|---|---|---|
| not driven past pole piece 76 | + | ON | OFF | OFF | ON | charges |
| driven past pole piece 76 | − | OFF | ON | ON | OFF | discharges and modulated by generator 30 |

FIG. 4 illustrates a simplified version of the system of FIG. 3. In this configuration, generator 30a provides the unipolar alternating current, similar to that of generator 30 of FIG. 1, except for the use of transistors Qp, which are complementary to the transistor types used in generator 30.

Because of the use of transistors Qp, which are PNP types, the center tap of winding 31 of generator 30a is at ground potential and the emitters of the Qp transistors are at +DC potential. A diode may be connected in series with each base wherein the anode of the diode is connected to the base in a forward base current direction. Such diodes will prevent currents from flowing in opposite direction to the normal base current flow and prevent damage of transistors Qp.

The pulse generating circuit using the magnetic type timer is the same as specified in the FIG. 3 configuration. The end of winding 77 which was connected to the base of transistor Q2 of FIG. 3, is now connected to the base of transistor Q4. Q4 collector is connected to junction 13 providing +DC potential to such collector, and the emitter of Q4 is connected to the base of transistor Qn through base current limiting resistor 26 in a typical Darlington circuit connection. All other connections to Qn and to generator 30a are the same as in the FIG. 1 configuration, except that the emitter of Q4 is herein connected to bias resistor 34 of generator 30a to provide the proper logic potential for operation of this configuration.

The logic of the system utilizing the magnetically generating pulse timer as in FIG. 4, may be summarized by the following table:

153 thereof being surrounded by enlarged spherical-like aura of luminous particles 156 and 157 respectively of such lesser particle concentration. The reason for both the spread-out ends 152 and 153 and the enlarged spherical aura 156 and 157 surrounding such ends respectively appears to be due to the high impact of these luminous particles upon the electrode and inner base periphery in view of the high velocity with which these luminous particles travel between such two points of the igniter base. One can analogize this phenomena to a bullet which spreads upon impact with a solid object due to the high bullet velocity and due to the high density of the object which the bullet cannot penentrate upon impact, even with such high velocity.

In either case, one important feature of this unusual arc configuration with its high velocity is that igniters can be used that have 250 thousandths of an inch radial spacing between its arcing members to produce longer arcs of about 350 thousandths of an inch due to these arcs taking a path which attempts to conform to the shape of the top of insulator 140. Such arcs will not be extinguished by the high internal engine pressures and will totally and efficiently enable the burning and conversion of all the fuel to useful engine power without wasting a good percentage of such fuel.

It should be noted that the arc shown in FIG. 7 is one obtained without AC modulation of the discharge current from winding 61, observed during the period when generator 30 was disconnected from the collector on Qn. When generator 30 was connected to the collector of Qn to modulate winding 61 discharge current, and particularly at high speed distributor shaft 10 rotation, several such arcs 150 were observed extending radially from electrode 120 to base 130 in several different directions. FIG. 8 shows an oscilloscopic photograph of the current pattern through primary winding 61 for several successive igniter firing periods when discharge current from primary winding 61 is modulated by an alternating current provided by generator 30 as shown in FIG. 1. The peak current amplitudes measured 9 amperes using a calibrated high frequency oscilloscope by measuring the voltage drop across a one-ohm resistor. Such current has a number of oscillation cycles accompanying each igniter current waveform, contributed by modulation pulses from generator 30.

FIG. 9 shows an oscilloscopic photograph of the current pattern through primary widing 61 when modulator 30 was disconnected from the collector of Qn. The current waveform of FIG. 9 was taken with the same oscilloscope settings as in the case of FIG. 8 and shows a reduced current level as compared with the modulated discharge current shown in FIG. 8. However, such current waveforms also contain oscillations accompanying each igniter current excursion though at reduced amplitudes.

FIG. 10 shows an oscilloscopic photograph of the induced voltage in primary winding 61 due to discharge current flow from winding 61 when the discharge current is modulated by electrical power delivered by generator 30. Such modulated discharge voltage has a number of excursions extending over each entire igniter firing period, and represents a significant improvement in terms of delivered igniter energy over the unmodulated case. The voltage induced in primary winding 61 was limited to 400 volts by the clamping circuit consisting of diode assembly Z and resistor 27, since it was found that excessive voltages, possible by using a higher zener knee voltage rated diode assembly Z, would increase the collector current level of Qn beyond its rated level and would result in damaging Qn. Additionally, at the 400 volt level, 3600 watts of instantaneous power is available in primary winding 61, and at a duty cycle of generator 30 of 50% and an average igniter firing period of 3 milliseconds, an energy level of 5.4 watt-seconds would be available to feed each igniter, which is considerably higher by a factor of 500 compared with the conventional ignition system energy delivery capability to an igniter.

FIG. 11 was photographed with the same oscilloscope settings as in the case of FIG. 10, and may be compared with FIG. 10. FIG. 11 shows the induced voltage pattern in primary winding 61 without modulation, that is when generator 30 was disconnected from the system of FIG. 1. In FIG. 11, the absence of modulation results in a limited number of excursions of such induced voltage with a resultant duty cycle which is about one-fifth the duty cycle duration of the modulated waveform of FIG. 10. However, the oscillations accompanying the major excursions of the waveform in FIG. 11 are visibly present.

Referring to FIG. 12, the induced voltage in primary winding 61 is displayed in the photograph for two successive igniter firing periods when modulator 30 is disconnected from the collector of Qn. This pattern was obtained using an expanded time base sweep rate of the oscilloscope, as compared with the sweep rate used to obtain FIG. 11 waveform, and also an increased vertical channel sensitivity of the oscilloscope, so that only a fractional part of the two igniter firing periods of FIG. 11 may be seen in detail in FIG. 12. Such detail shows a plural number of sequential voltage ringing cycles for each waveform having bipolar ringing excursions. Such ringing excursions were obtained without the use of any discrete capacitor connected to either the primary or secondary windings of transformer 60, and with generator 30 disconnected from the collector of Qn.

No attempt is made to explain the ringing action in the current and voltage waves as seen in FIGS. 9, 11 and 12 in the absence of a capacitor normally in series with the primary winding of the ignition transformer to effect such ringing, except to observe that primary winding 61 is first charged by conduction of DC current from battery 12 through Qn and since during oscillation or ringing as seen in FIG. 12, Qn does not conduct, it appears reasonable to attribute the oscillation to a current component due to displacement of the charge within winding 61. Such reasoning would be consistent with Maxwell's theory that a current not only comprises a conduction component but also a displacement component. Another explanation is that the discharge of winding 61 constitutes a current conduction component which flows through the inherent collector-to-emitter capacitance of Qn to start inducing a ringing voltage in the secondary winding 62 of transformer 60.

In the laboratory test set up of this system, a conventional distributor was motor-driven by driving shaft 10 thereof at a speed comparable to an engine's 3000 revolutions per minute. The distributor had four igniter ports so that four igniters were fired in sequence. The gap-adjusting members from each of the igniters were removed so that the generated arc could fire between the axial electrode 120 and the inner periphery of the igniter base 130. Igniters having 18 and 14 millimeter diameter bases were used. Therefore, the arc lengths at 150, between the axial electrode and base, ranged from 250 to 350 thousands of an inch in length.

The measurements of voltage and current were made using an accurately calibrated Hewlett-Packard 50 megahertz oscilloscope. The current was measured by utilizing a one-ohm high power resistor in series with winding 61 and measuring the voltage across the one-ohm resistor using the calibrated oscilloscope. The voltage across winding 61 was measured by using a high resistance voltage divider across winding 61 substantially higher in resistance than the impedance presented by winding 61 so as to effect reasonably accurate voltage readings across the lower resistance portion of such voltage divider. The fact that the voltage divider was of sufficiently high resistance value to enable making such measurements was determined by observing that the voltage oscilloscopic pattern did not decrease in amplitude when such voltage divider was connected across winding 61. The need for such voltage divider was due to the fact that the internal attenuators of the oscilloscope were in themselves not sufficient to reduce the actual voltage excursions so as to bring the entire peak-to-peak voltage envelope within the confines of the face of the oscilloscope's cathode ray tube.

I claim:

1. An ignition system for a fuel burning engine including a timer for effecting first and second states of operation of said system, comprising the combination of:
   alternating current modulation means having an output transformer with an output winding for providing alternating current from said output winding during the second state;
   an ignition transformer with a single primary winding coupled in series to said output winding during the second state; and
   electronic logic means, connected to said primary winding and controlled by said timer and coupled to said output winding, for enabling charging current to flow in the primary winding during the first state, for inhibiting said charging current and alternating current from flowing in said output winding during the first state, and for enabling said alternating current to flow in said output winding and primary winding so as to modulate discharge current of the primary winding during said second state.

2. The system as stated in claim 1, wherein said logic means includes an electronic switch connected to the output winding, said electronic switch providing an electrical bypass path across the output winding during the first state.

3. The system as stated in claim 1, wherein said ignition transformer has a secondary winding coupled to the primary winding, and a capacitor connected to the secondary winding.

4. The system as stated in claim 1, wherein said timer is a magnetically generating pulse type.

5. The system as stated in claim 1, wherein said timer is a cam-actuated pair of contactors.

6. The system as stated in claim 1, wherein said timer includes an electrically conductive disk having a plural number of electrically insulative members regularly spaced about the periphery of the disk and within the confines of said disk, and a contactor in cooperation with said periphery.

7. The system as stated in claim 1, wherein said timer is an optically generating pulse type.

8. An ignition system for a fuel burning engine including a timer for effecting first and second states of operation of said system, comprising the combination of:
   Alternating current modulation means having an output transformer with an output winding for providing alternating current from said output winding during the second state;
   a capacitor connected to said output winding and forming a series circuit therewith;
   an ignition transformer with a single primary winding coupled in series to said series circuit during the second state; and
   electronic logic means, connected to said primary winding and controlled by said timer and coupled to said series circuit, for enabling charging current to flow in the primary winding during the first state, for inhibiting said charging current and alternating current from flowing in said series circuit during the first state, and for enabling said alternating current to flow in said series circuit and primary winding so as to modulate discharge current of the primary winding during said second state.

9. The system as stated in claim 8, wherein said logic means includes an electronic switch connected to said series circuit, said electronic switch providing an electrical bypass path across the series circuit during the first state.

10. The system as stated in claim 8, wherein said ignition transformer has a secondary winding coupled to the primary winding, and a capacitor connected to the secondary winding.

11. The system as stated in claim 8, wherein said timer is a magnetically generating pulse type.

12. The system as stated in claim 8, wherein said timer is a cam-actuated pair of contactors.

13. The system as stated in claim 8, wherein said timer includes an electrically conductive disk having a plural number of electrically insulative members regularly spaced about the periphery of the disk and within the confines of said disk, and a contactor in cooperation with said periphery.

14. The system as stated in claim 8, wherein said timer is an optically generating pulse type.

15. A method of igniting fuel in a fuel burning engine, comprising in combination the steps of:
   charging a primary winding of an ignition transformer while creating an electrical bypass path by means of an electronic logic circuit across a capacitor and an output winding of an output transformer of a modulator, wherein said output winding and said capacitator are series coupled to said primary winding;
   creating a discharge current flow in said primary winding by means of said electronic logic circuit, capacitor and output winding, and modulating said discharge current with alternating current fed by the output winding; and
   generating an electrical arc across igniter electrodes.

16. The method as stated in claim 15, wherein said electrical arc has a maximum length of 350 thousandths of an inch.

* * * * *